(12) United States Patent
Wojtkowicz et al.

(10) Patent No.: US 8,700,284 B2
(45) Date of Patent: Apr. 15, 2014

(54) CHARGE WHILE BEING FLAT TOWED FEATURE FOR ELECTRIC VEHICLES

(75) Inventors: Scott Wojtkowicz, Livonia, MI (US); Joseph Norman Ulrey, Dearborn, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 73 days.

(21) Appl. No.: 13/471,502

(22) Filed: May 15, 2012

(65) Prior Publication Data

US 2013/0311058 A1    Nov. 21, 2013

(51) Int. Cl.
*G06G 7/00* (2006.01)

(52) U.S. Cl.
USPC .......... 701/70; 903/907; 903/947; 180/65.27; 180/65.29; 280/656

(58) Field of Classification Search
USPC .............. 701/22, 70; 903/902–907, 930, 947; 180/65.1, 65.21, 65.27, 65.29; 280/656
See application file for complete search history.

(56) References Cited

U.S. PATENT DOCUMENTS

| | | | |
|---|---|---|---|
| 6,668,225 B2 | 12/2003 | Oh et al. | |
| 6,866,350 B2 | 3/2005 | Palmer et al. | |
| 7,712,760 B2 | 5/2010 | Ohtomo | |
| 7,743,859 B2 * | 6/2010 | Forsyth | 180/65.1 |

* cited by examiner

*Primary Examiner* — Russell Frejd
(74) *Attorney, Agent, or Firm* — David B. Kelley; Brooks Kushman P.C.

(57) ABSTRACT

A towed vehicle is towed by a towing vehicle. The towed vehicle includes a motor/generator for both regenerative braking and for powering wheels. A tow member connects the towed vehicle to the towed vehicle. A sensor measures or infers the tension and compression in the tow member. A computer communicates with the sensor and with the motor/generator. The computer commands the motor/generator to either utilize regenerative braking or provide assistance in propulsion of the towed vehicle based upon the tension and compression forces in the tow member.

20 Claims, 6 Drawing Sheets

CHARGE WHILE BEING FLAT TOWED FEATURE FOR ELECTRIC VEHICLES

TECHNICAL FIELD

The present disclosure relates to a braking system in a vehicle, in particular a system for controlling regenerative braking in a towed vehicle.

BACKGROUND

Hybrid electric vehicles (HEVs), plug-in hybrid electric vehicles (PHEVs), and battery electric vehicles (BEVs) are examples of vehicles that are at least partially driven by an electric motor. These vehicles can broadly be referred to as "electric vehicle." Electric vehicles typically utilize regenerative braking, in which a traction motor serves as a generator to convert the kinetic energy of the vehicle into electric energy that is stored in a traction battery. There exists a need to effectively utilize the powertrain of the electric vehicle while the electric vehicle is being towed.

SUMMARY

According to one aspect of the present disclosure, a braking system is provided for a vehicle that is towed. The system includes a tow member for attaching the towed vehicle to a towing vehicle. The towed vehicle has a fraction motor and a traction battery. The system also includes a sensor for measuring a tensile load in the tow member. The tensile load may include tension forces and/or compression forces exerted on the tow member. A computer is provided that is programmed to control regenerative braking of the towed vehicle based upon the sensed tensile load.

According to another aspect of the present disclosure, a method for controlling a tensile load between connected vehicles is provided. The method includes receiving information that is indicative of a tensile load in a connecting member. The connecting member connects a towing vehicle to a towed vehicle. The method further includes controlling regenerative braking in the towed vehicle based upon the tensile load. In at least one embodiment, the controlling of the regenerative braking may include increasing the amount of regenerative braking based upon a decreased amount of tensile load in the connecting member.

According to another aspect of the present disclosure, a vehicle is provided. The vehicle includes a traction motor for propelling wheels, and a traction battery electrically connected to the traction motor. The vehicle also includes a mount disposed on either a front end or a rear end of the vehicle for attaching a tow member. The tow member connects the vehicle to a towing vehicle. The vehicle also includes a computer programmed to receive information indicative of a tensile load in the tow member. The computer also controls regenerative braking in the vehicle based upon the tensile load.

DETAILED DESCRIPTION

Detailed embodiments of the present invention are disclosed herein. It is to be understood that the disclosed embodiments are merely exemplary of the invention that may be embodied in various and alternative forms. The figures are not necessarily to scale, as some features may be exaggerated or minimized to show details of particular components. Specific structural and functional details disclosed herein are therefore not to be interpreted as limiting, but merely as a representative basis for teaching one skilled in the art to variously employ the present invention.

Figure 1:
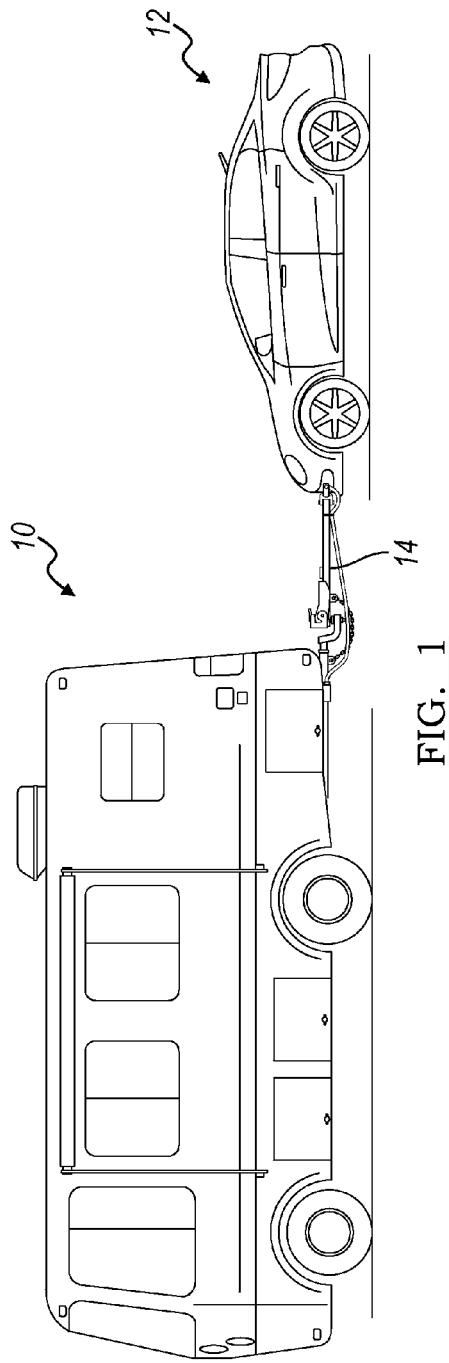
FIG. 1 is a side view of one vehicle towing another vehicle via a tow member.

Referring to FIG. 1, a towing vehicle 10 is provided. The towing vehicle 10 may be a recreational vehicle (RV), a truck, a car, or any other vehicle capable of towing another vehicle. On long drives, for example, it may be desirable to tow a towed vehicle 12 in order to conserve energy. The towed vehicle 12 is thus towed behind the towing vehicle 10. A connecting member or tow member 14 connects the towing vehicle 10 to the towed vehicle 12. The tow member 14 may be a trailer hitch that includes a ball mount and tow-ball attached to the chassis of the towing vehicle 10, and a corresponding coupler attached to the towed vehicle 12 adapted to receive the tow-ball. Further detail of the tow member will be provided with regard to the description of FIG. 3.

Figure 2:
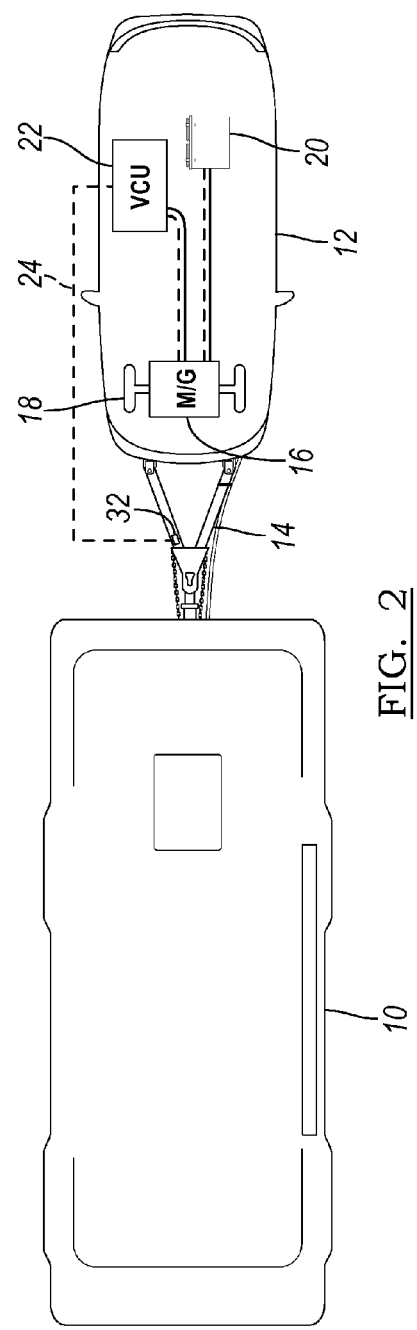
FIG. 2 is a schematic view of a vehicle towing an electric vehicle.

Referring to FIG. 2, the towing vehicle 10 is connected to the towed vehicle 12 via the tow member 14. The towed vehicle 12 may be a battery electric vehicle (BEV) in which an electric machine, or motor/generator (M/G) 16, propels the wheels 18 of the vehicle 12 without an internal combustion engine. Alternatively, the towed vehicle 12 may be any other electric vehicle that is at least partially propelled by a M/G 16. For instance, in a hybrid electric vehicle (HEV), the vehicle 12 is propelled by both the M/G 16 and an internal combustion engine (not shown). Therefore, the towed vehicle 12 illustrated in FIG. 2 is only one embodiment and it should be understood that the towed vehicle 12 is not limited to only being that of a BEV.

During normal operation of the vehicle 12 without being towed, the M/G 16 may operate as a motor to provide torque to the wheels 18. The M/G 16 may also operate as a generator in which the M/G 16 receives torque from the wheels 18 and charges a battery 20 during regenerative braking. The M/G 16 may be one electrical machine capable of acting as both a traction motor and a generator, or may be defined by a traction motor and a separately connected generator. The stored energy in the battery 20 may be used for many purposes, including propelling the wheels 18 and powering on-board electronics in the vehicle 12. Furthermore, if the towed vehicle 12 includes a combustion engine (e.g., in the case of a HEV), then the M/G 16 may be configured to receive torque from both the engine and the wheels 18 to charge the battery 20.

As in the case of normal operation of the vehicle 12 without being towed, regenerative braking may be utilized while the vehicle 12 is being towed. For instance, during flat towing (as illustrated in FIG. 1), all four wheels of the towed vehicle 12 contact the road, therefore enabling the towed vehicle 12 to utilize its regenerative braking system. The battery 20 may also power electronics or accessories in the towing vehicle 10 if the towing vehicle 10 is electrically connected to the towed vehicle 12.

A vehicle control unit (VCU) 22 is also provided in the towed vehicle 12. The VCU 22 may be a single computer unit or a plurality of computers communicating in a control area network (CAN), for example. The VCU 22 may be a vehicle system controller/powertrain control module (VSC/PCM). In this regard, the PCM portion of the VSC/PCM may be software embedded within the VSC/PCM, or it can be a separate hardware device. The VCU 22 generally includes any number of microprocessors, ASICs, ICs, memory (e.g., FLASH, ROM, RAM, EPROM and/or EEPROM) and software code to co-act with one another to perform a series of operations. It should be understood that the towed vehicle 12 may have a plurality of computers and control units communicating with various portions of the vehicle 12, and for purposes of the present disclosure, these control units are referred to as the VCU 22.

The VCU 22 is electrically connected to both the M/G 16 and the battery 20 and is programmed to control the M/G 16 and the battery 20. For example, the VCU determines if acceleration by a driver is requested, and responds by powering the M/G 16 with electrical power in the battery 20. Furthermore, in a braking event in which the battery 20 has been charged beyond a predetermined limit, the VCU 22 will prevent regenerative braking from over-charging the battery 20 and may instead command friction brakes to engage the wheels 18. The VCU 22 is also electrically connected to the tow member 14 via electrical connection 24. Information relating to tension in the tow member 14, for example, is sent to the VCU 22 as will be discussed.

Figure 3:
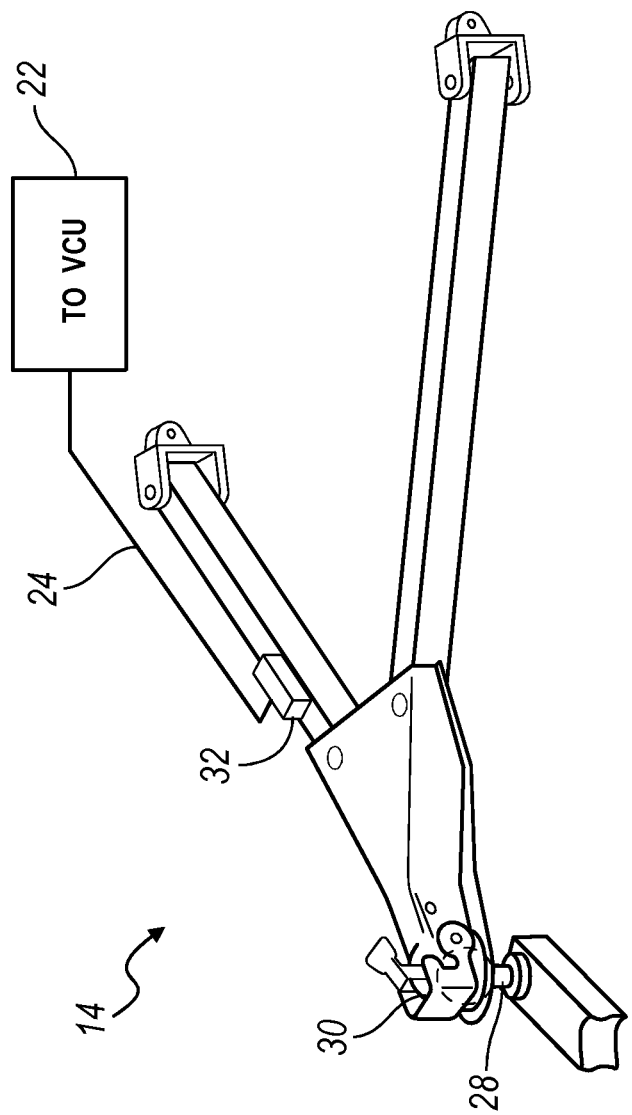
FIG. 3 is a perspective view of the tow member having a tensile load sensor.

Referring to FIG. 3, the tow member 14 is illustrated according to one embodiment of the present disclosure. The tow member 14 couples the towing vehicle 10 to the towed vehicle 12. The tow member 14 includes a tow-ball 28 mounted to the towing vehicle 10, and a corresponding coupler 30 mounted to the towed vehicle 12. It should be understood that for purposes of the present disclosure, the term "tow member" 14 may not include the tow-ball 28, as the tow-ball 28 may be part of the towing vehicle 10 for example. It should also be understood that the tow member 14 may be a tow chain or any other mechanical connection that attaches the towing vehicle 10 to the towed vehicle 12.

A sensor 32 is disposed on the tow member 14. The sensor 21 is electrically connected to the VCU 22 via electrical connection 24. The sensor 32 determines tensile loads in the tow member 14 and communicates the tensile load measurements to the VCU 22. The tensile loads measured in the tow member 14 by sensor 32 include both tension and compression forces. For example, during a sudden braking event by the towing vehicle 10 or during downhill travel, the towed vehicle 12 urges the towing vehicle 10 forward, thus providing a compression force in the tow member 14 which is measured by the sensor 32. Similarly, during a sudden acceleration by the towed vehicle or during uphill travel, the towed vehicle 12 urges the towing vehicle backward, thus providing a tension force in the tow member 14 which is measured by the sensor 32. The sensor 32 may be mounted to any location on the tow member 14 that would yield accurate measurements of the tensile loads in the connection between the towing vehicle 10 and the towed vehicle 12. It should be understood that the term "tensile load" may refer to the interrelated tension and compression forces in the tow member 14; an increase in tension forces is intended to mean the same as a decrease in compression forces, and a decrease in tension forces is intended to mean the same as an increase in compression forces.

Sensor 32 is preferably a tension sensor including load cells for measuring tension and compression forces in the tow member 14. However, many other sensors are contemplated that, while not being tension sensors, nonetheless lead the VCU to determine the tensile loads in the tow member 14. For example, according to one embodiment, the sensor 32 may be a speed sensor connected to both the towing vehicle 10 and the towed vehicle 12 to measure speed or acceleration differences between the vehicles. If the speed of the towing vehicle 10 is greater than that of the towed vehicle 12, a tension force may therefore be inferred in the tow member 14 by VCU 22. According to another embodiment, the sensor 32 may be a proximity sensor (e.g., radar) or a contact distance sensor (e.g., cable) mounted to either the tow member 14 or one of the vehicles to determine the distance between the towing vehicle 10 and the towed vehicle 12. If the distance between the towing vehicle 10 and the towed vehicle 12 is determined to be below a threshold, a compression force may be inferred in the tow member 14 by VCU 22. According to yet another embodiment, the sensor 32 is a GPS unit that communicates with a network of satellites to determine the distance between the towing vehicle 10 and the towed vehicle 12. According to yet another embodiment, the sensor 32 includes a camera that infers distance due to the changes in size of elements in its sight. For example, a camera may be mounted on the towed vehicle 12 or tow member 14 that communicates a change in size of the license plate of the towing vehicle 10, and the VCU 22 computes the tensile load in the tow member 14 based on the changes in size. While these and other embodiments differ in the utilization of the sensor 32, the measurements allow VCU 22 to infer or compute the tensile loads in the tow member 14. It should be understood that references herein are made to the "tensile load" in the tow member 14, and the "tensile load" is either directly determined by the sensor 32, or computed by the VCU 22 from distance or speed readings from the sensor 32 according to any of the aforementioned embodiments.

Referring to FIGS. 1-3, during a braking request by the operator of the towing vehicle 10, the added mass of the towed vehicle 12 increases the amount of braking force needed to come to a stop. Similarly, during an acceleration request by the operator of the towing vehicle 10, the towed vehicle 12 increases the amount of time it takes to reach a desired speed and increases the work load on the engine of the towing vehicle. Regenerative braking and motor assist may be utilized by the M/G 16 and battery 20 in the towed vehicle 12 to benefit the drivability of the towing vehicle 10 during travel. The tensile load in the tow member 14 is sent to the VCU 22. The VCU 22 communicates with the M/G 16 and battery 20 to utilize regenerative braking to manage the tensile force in the tow member 14. If a compression force in the tow member 14 is detected exceeding a predetermined limit (e.g., the towing vehicle 10 is braking), the VCU 22 commands the M/G 16 to begin regenerative braking. The regenerative braking reduces the compression in the tow member 14, charges the battery 20, and helps the towing vehicle 10 decelerate. If the compression force in the tow member 14 falls below a predetermined limit, the VCU 22 commands the M/G 16 to reduce or cease regenerative braking, thereby allowing the towing vehicle 10 to operate without the drag of regenerative braking in the towed vehicle 12.

Alternatively, if the tension force in the tow member 14 exceeds a predetermined limit (e.g., towing vehicle 10 is accelerating), the VCU 22 may command the M/G 16 to reduce or cease regenerative braking, or may command the M/G 16 to power the wheels 18 to aid in propelling the towed vehicle 12. The reduction in regenerative braking or the increase in propelling from the M/G 16 acts as a "pushing" force that combats an increase in tension in the tow member 14 and also reduces the overall drag on the towing vehicle 10. The VCU 22 may control the M/G 16 to either power the wheels 18 or to provide regenerative braking to the battery 20 in attempt to maintain a constant tensile load in the tow member 14.

The VCU 22 may also receive measurements from the sensor 32 indicating relative speeds of the vehicles 10, 12, and/or the incline in which the vehicles 10, 12 are traveling. For instance, if the towing vehicle 10 is towing up a steep incline, large amounts of tension may exist in the tow member 14 due to gravity. If the operator of the towing vehicle 10 applies brakes, tension in the tow member 14 may still exist while traveling on the incline. The converse is true as well, in that large compression forces may still exist in the tow member 14 if the operator of the towing vehicle 10 accelerates while traveling downhill. The relative speeds and slopes of the vehicles 10, 12 may therefore be included in the determination by VCU 22 as to when to activate regenerative braking or motor assist, and to what amount.

The VCU 22 may also receive information indicative of a state of charge (SOC) of the battery 20. During regenerative braking, the VCU 22 monitors and controls the SOC to prevent overcharging of the battery 20. If the SOC of the battery 20 exceeds a predetermined limit or threshold, the VCU 22 may prevent regenerative braking in the towed vehicle 12, regardless of the tensile loads in the tow member 14. During times of high SOC and high compression in the tow member, the VCU 22 may activate conventional friction at the wheels 18 instead of regenerative braking. The VCU 22 may, for example, increase the load of the friction brakes at the wheels 18 based upon a compression force in the tow member 14 exceeding a threshold, similar to the embodiments employing regenerative braking. In one embodiment, the VCU 22 may infer the tensile load in the tow member 14 from the following:

$$F=(m\alpha)+(m\theta)+k_1+(k_2 v)+(k_3 v^2)$$

where F is the tensile load, m is mass of the towed vehicle 12, $\alpha$ is the acceleration of the towed vehicle 12, $\theta$ is the grade or incline of travel, k is a calibration coefficient, and v is velocity of the towed vehicle 12.

Referring to FIGS. 2 and 4A-D, graphical representations are provided that illustrate the use of regenerative braking and motor assist based upon the tensile load in the tow member 14 according to at least one embodiment of the present disclosure. In each of FIGS. 4A-D, line 100 represents a normal relationship of tensile forces in the tow member 14 during acceleration and deceleration of the towing vehicle 10 and the towed vehicle 12. Line 100 is intended to illustrate the tension and compression forces in the tow member 14 if no regenerative braking or motor assist is commanded by the VCU 22. As the vehicles 10, 12 accelerate, tension on the tow member 14 increases. Similarly, as the vehicles 10, 12 decelerate, the compression on the tow member 14 increases (and the tension decreases). The line 100 is vertically shifted from the center due to the drag of the towed vehicle 12 causing tension on the tow member 14 even during times of constant speed.

Figure 4A:
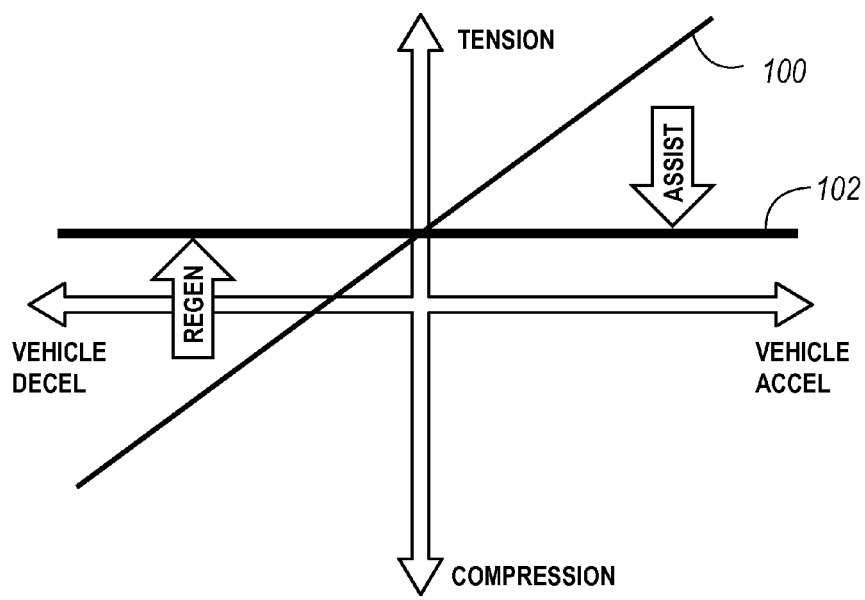
FIGS. 4A-D are graphical representations of regenerative braking and motor assist utilized based on the tensile load during vehicle acceleration and deceleration.

Referring to FIGS. 2 and 4A, a constant tensile load in the tow member 14 is represented by target line 102. In the embodiment illustrated in FIG. 4A, the VCU 22 may be programmed to utilize both regenerative braking and motor assist at varying amounts to maintain a relatively constant tensile load during travel. This is represented by the "REGEN" and "ASSIST" arrows throughout FIGS. 4A-D, in which the VCU 22 commands regenerative braking and motor assist to attempt to bring line 100 in line with target line 102 during travel, thereby maintaining a relatively constant tensile load in the tow member 14. As the magnitude of acceleration or deceleration in the vehicles 10, 12 increases, the amounts of regenerative braking and motor assist may increase, respectively.

Figure 4B:
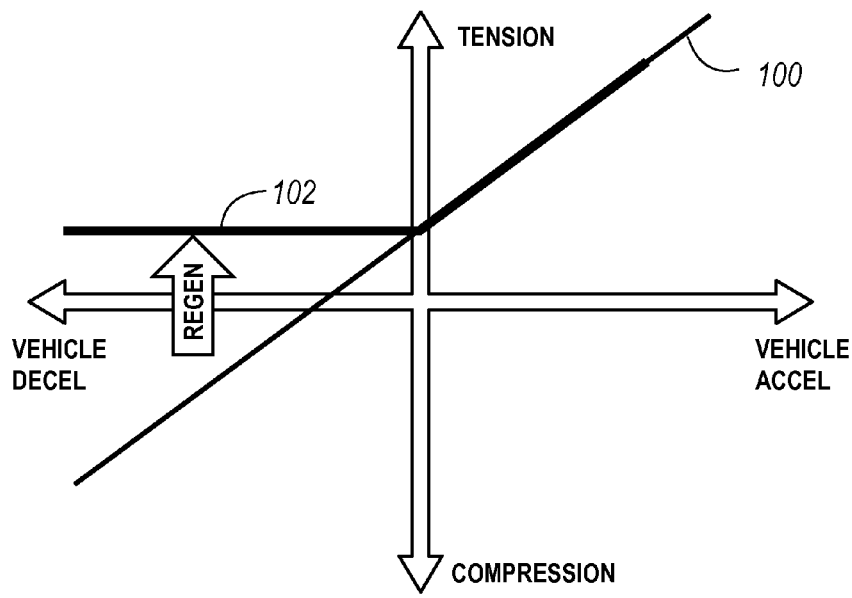

Referring to FIGS. 2 and 4B, the target line 102 may be modified to meet different specific goals. For instance, the target line 102 may be modified such that the VCU 22 will not command motor assist, but will command regenerative braking in proportion to increasing compression forces as the vehicles 10, 12 decelerate. Similar to the embodiment illustrated in FIG. 4A, regenerative braking may be utilized during high braking commands and compression forces in the tow member 14. The embodiment illustrated in FIG. 4B may be implemented, for example, if the SOC of the battery 20 is below a threshold, such that depletion of stored energy in the battery 20 in the form of motor assist is undesirable.

Figure 4C:
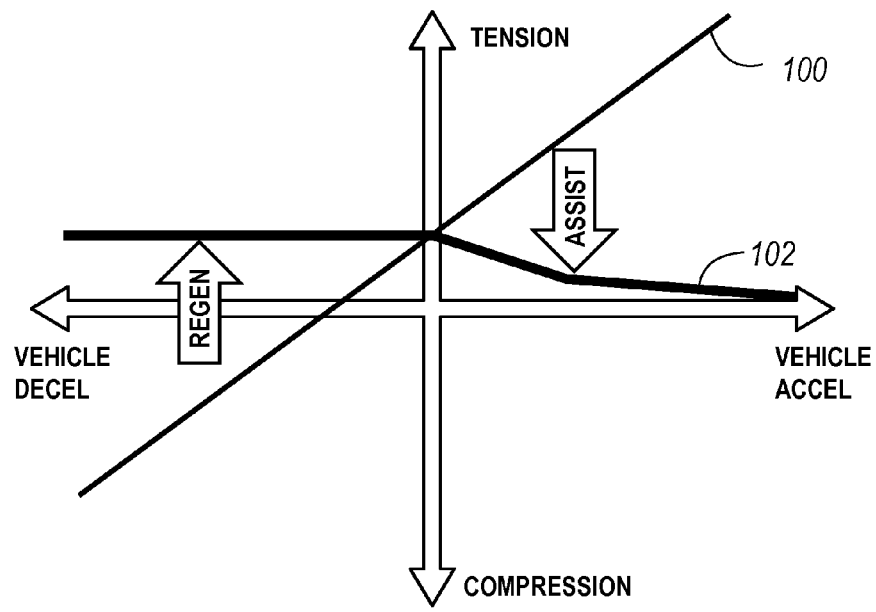

Referring to FIGS. 2 and 4C, the target line 102 has been modified according to another embodiment of the present disclosure. In this embodiment, the target line 102 is modified such that the VCU 22 utilizes the M/G 16 to actively assist the towed vehicle 12 to reduce the tension in the tow member 14 during acceleration. An increased amount of electric assist from the M/G 16 during high demand of acceleration reduces the tension in the tow member 14 and the drag of the towed vehicle 12. This enables more efficient acceleration in the towing vehicle 10. The embodiment illustrated in FIG. 4C may be implemented, for example, when the SOC is above a threshold and the acceleration demands (pedal position) is relatively large.

Figure 4D:
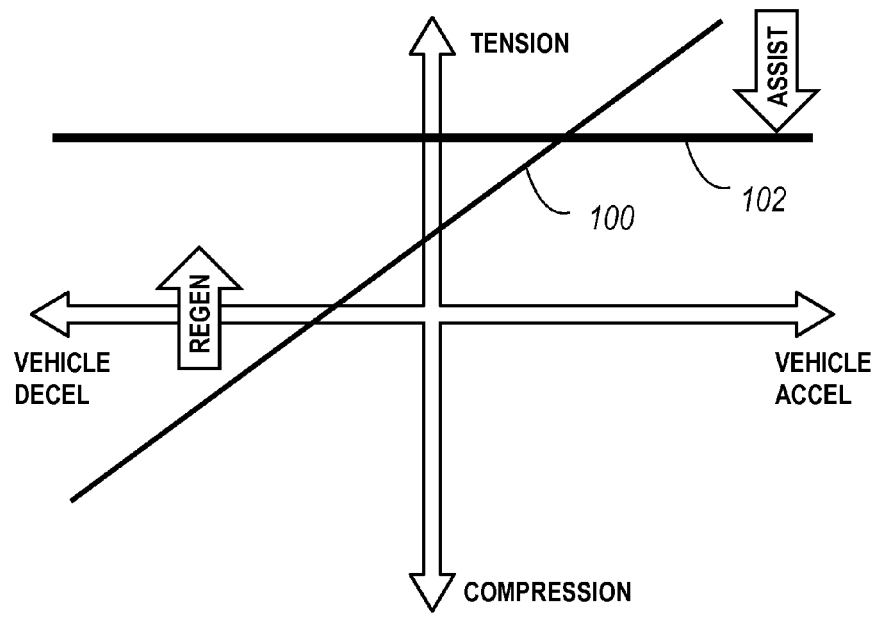

Referring to FIGS. 2 and 4D, the target line 102 has been modified according to yet another embodiment. In this embodiment, the target line 102 has been vertically shifted such that the intersection of lines 100, 102 occurs while the vehicles 10, 12 are accelerating. Regenerative braking is therefore commanded by the VCU 22 even during acceleration. Furthermore, the higher the target line 102 is shifted, the more amount of acceleration is needed until the regenerative braking is ceased. The embodiment illustrated in FIG. 4D may be implemented, for example, when the SOC of the battery 20 is below a threshold, and the desire to charge the battery 20 is relatively large.

It should be understood that the embodiments illustrated in FIGS. 4A-D are merely examples of the results of various programmable instructions in the VCU 22. As will be described with reference to FIG. 5, a user may also program the towed vehicle 12 to utilize regenerative braking and motor assist in various fashions, based on desired charging of the battery 20, for example.

Figure 5:
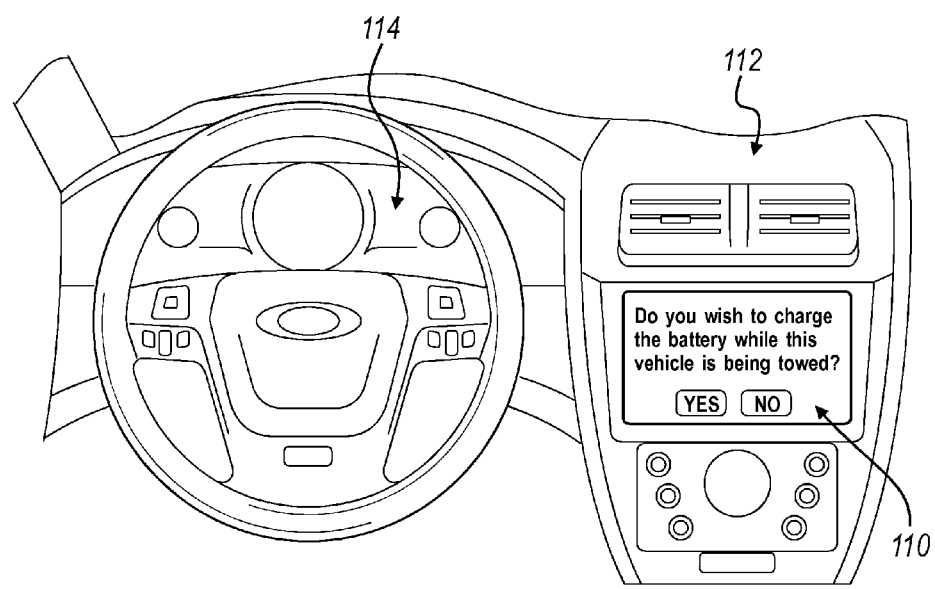
FIG. 5 is a front view of an interior of an electric vehicle.

Referring to FIG. 5, a user interface 110 is located in a central portion of the dashboard 112 of the vehicle 12, according to one embodiment. The user interface 110 may also supplement another display system, such as a navigation system or an entertainment control interface. The user interface 110 may be a liquid crystal display (LCD), organic light emitting display (OLED), plasma display, or any other visual display. The user interface 110 may include buttons or be a touch screen that bilaterally transfers information between the vehicle 12 (or VCU 22) and the driver. While illustrated as being located in the central dashboard 112, the user interface 110 may also be located within an instrument panel 114 according to another embodiment, in which buttons on or around the steering wheel may communicate with the user interface 110.

Referring to FIGS. 2 and 5, the user interface 110 provides a user of the vehicle 12 with various tow options that command the VCU 22 to control the regenerative braking in various manners as will be discussed. The user interface 110 first may enable the user to navigate through menus in order to activate a "tow mode," for example, which enables VCU 22 to utilize regenerative braking during the towing. Once the "tow mode" is activated, the user may then choose between various towing options. For example, in a "constant tow force" mode, the VCU 22 will activate regenerative braking and/or motor assist in the M/G 16 in order to maintain a relatively constant tensile load in the tow member 14 (e.g., the embodiment illustrated in FIG. 4A). In a "fastest charge rate" mode, the threshold to activate regenerative braking may be very low, and regenerative braking may be utilized even during coasting or low amounts of acceleration, for example (e.g., the embodiment illustrated in FIG. 4D). In a "charge only during braking" mode or a "charge only during deceleration" mode, the regenerative braking will charge the battery 20 only at times in which a braking or deceleration force in the either vehicle 10, 12 is sensed (e.g., the embodiment illustrated in FIG. 4B). If optimum acceleration of the towing vehicle 10 is desired during travel, a "never charge on acceleration" mode will prevent the VCU 22 from activating regenerative braking during times of acceleration of either vehicle 10, 12.

These modes and other modes are contemplated as providing the user with options for various methods of charging the battery 20 depending on the desirability in the charging rate of the battery 20 and the drivability of the towing vehicle 10. The effects of some of the various charging rates are exemplified in FIGS. 4A-D. Once a mode is selected, the user may exit the vehicle 12 and begin towing the vehicle 12. The selected mode may remain until the user later selects a different charging mode, deactivates the charging mode, or disconnects the towed vehicle from the tow member 14.

Figure 6:
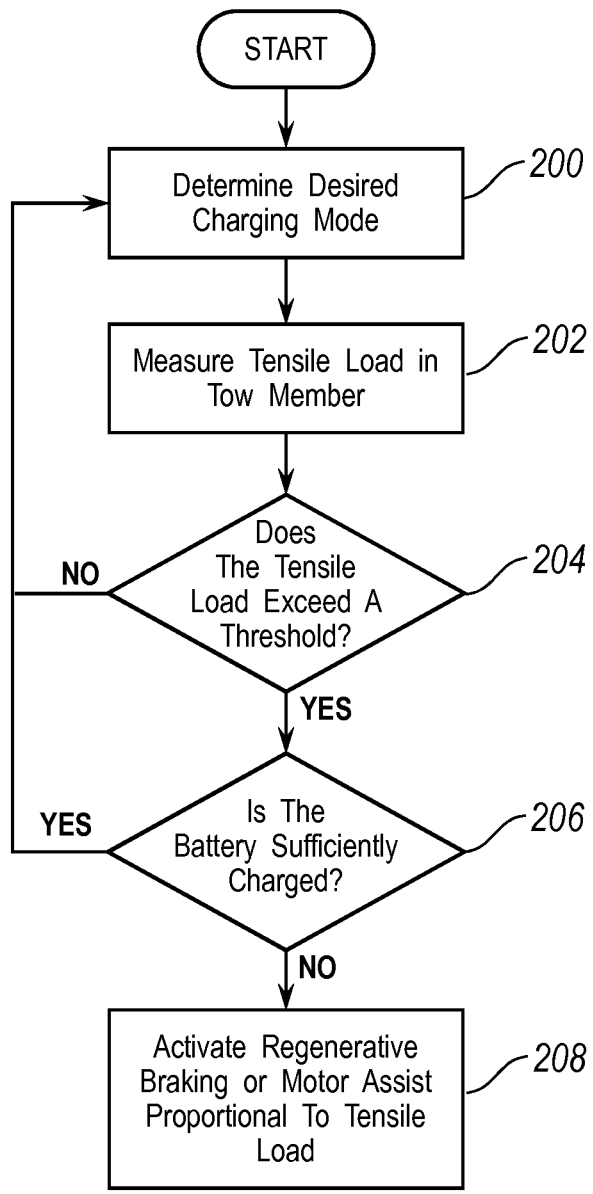
FIG. 6 is a flow chart illustrating a method of controlling regenerative braking according to one embodiment of the present disclosure.

Referring to FIGS. 2 and 6, a method of controlling the tensile load between connected vehicles is illustrated according to one or more embodiments. The method may be implemented by the VCU 22 or other computer, as described with reference to FIG. 2. At 200, the VCU 22 receives a desired charging mode as selected by a user. This may be accomplished by the user, for example, by navigating through various options in the user interface 110, as explained with reference to FIG. 5. If no desired charging mode is selected, a default charging mode may be designated. At 202, the tensile load (tension and compression) in the tow member 14 is determined. The tensile load may be determined directly by the tension and compression forces, or indirectly by indications such as speed differentials in the vehicles and other indirect indications previously described. At 204, a comparison is made between the measured tensile load and a predetermined threshold. If the tensile load does not exceed the threshold, the process starts again at 200. If the tensile load exceeds the threshold, the process proceeds to 206. The threshold may vary, for instance, based upon the desired sensitivity of tensile loads that cause the VCU 22 to activate regenerative braking. At 206, the SOC of the battery 20 is determined and compared with a charging threshold. The charging threshold may be any value, but preferably is of the amount between 80-95% of full battery charging capacity to further prevent overcharging. If it is determined that the SOC is above the threshold, the process starts again at 200. In another embodiment, if the SOC is above the threshold, regenerative braking may be prevented but motor assist from M/G 16 may be allowed. If the SOC is below the threshold indicating that the battery 20 is not sufficiently charged, the process continues to 208. At 208, regenerative braking or motor assist from the M/G 16 is activated in accordance with the various embodiments previously described. The regenerative braking or motor assist may be applied in proportion to the tensile load measured at 204. In this fashion, a larger load or strain on the tow member 14 will cause a proportionally larger amount of regenerative braking or motor assist to reduce the load.

While exemplary embodiments are described above, it is not intended that these embodiments describe all possible forms of the invention. Rather, the words used in the specification are words of description rather than limitation. It is also contemplated that various embodiments of the present disclosure may be combined or rearranged to achieve a specific result. Furthermore, to the extent that particular embodiments described herein are described as less desirable than other embodiments or prior art implementations with respect to one or more characteristics, the other embodiments and the prior art implementations are not outside the scope of the disclosure and may be desirable for particular applications.

What is claimed is:

1. A braking system for towing hybrid vehicles, comprising:
    a towed vehicle having an engine and a traction motor capable of propelling the vehicle;
    a tow member for attaching the towed vehicle to a towing vehicle;
    a sensor for measuring a tensile load in the tow member; and
    a computer programmed to control regenerative braking of the towed vehicle based upon the tensile load.

2. The system of claim 1, wherein the computer is programmed to increase the amount of regenerative braking based upon a decrease of the tensile load in the tow member.

3. The system of claim 2, wherein the computer is programmed to control the amount of regenerative braking to maintain a generally constant tensile load in the tow member.

4. The system of claim 1, wherein the sensor includes a distance sensor for measuring the distance between the towed vehicle and the towing vehicle to indicate the tensile load in the tow member.

5. The system of claim 1, wherein the computer is programmed to increase an output of the traction motor based upon an increase of the tensile load in the tow member.

6. The system of claim 1, wherein the computer is further programmed to control regenerative braking of the towed vehicle based upon a state of charge of the traction battery.

7. The system of claim 6, wherein the computer is further programmed to activate friction braking in the towed vehicle based upon the state of charge.

8. The system of claim 1, further comprising a sensor for measuring an incline of travel, wherein the computer is further programmed to control the regenerative braking of the towed vehicle based upon the incline.

9. The system of claim 1, further comprising a user interface in the towed vehicle that enables a user to activate a plurality of modes of operation in which the computer activates the regenerative braking according to various controls.

10. A method for controlling a tensile load between connected vehicles, the method comprising:
    receiving information indicative of a tensile load in a connecting member that connects a towing vehicle to a towed vehicle, the tensile load defining a tension and/or a compression;

controlling an amount of regenerative braking of the towed vehicle based at least upon the tensile load;

reducing the amount of regenerative braking of the towed vehicle based upon a state of charge of a traction battery disposed in the towed vehicle exceeding a first charge threshold;

inhibiting regenerative braking in the towed vehicle based upon the state of charge exceeding a second charge threshold less than full state of charge capacity; and preventing the step of inhibiting based upon the compression in the connecting member exceeding a compression threshold.

11. The method of claim 10, wherein the receiving includes receiving information indicative of a decreased amount of tensile load, and wherein the controlling includes increasing the amount of regenerative braking based upon the decreased amount of tensile load.

12. The method of claim 10, further comprising maintaining a generally constant tensile load in the connecting member by controlling the amount of regenerative braking of the towed vehicle.

13. The method of claim 12, further comprising maintaining the generally constant tensile load in the connecting member by increasing an output of a traction motor in the towed vehicle.

14. The method of claim 10, further comprising visually providing a user with an option to selectively control a plurality of modes of operation in which regenerative braking is activated according to various controls.

15. The method of claim 14, wherein one mode of operation activates regenerative braking based upon acceleration of the towed vehicle.

16. A vehicle comprising:

a fraction motor for propelling wheels;

a fraction battery electrically connected to the traction motor;

a mount disposed on one of a front end and rear end of the vehicle for attaching to a tow member that connects the vehicle to a towing vehicle;

a computer programmed to receive information indicative of a tensile load in the tow member and activate regenerative braking in the vehicle based upon the tensile load; and a user interface enabling a user to activate various modes of operation, wherein regenerative braking is activated by the computer according to different controls amongst the various modes of operation.

17. The vehicle of claim 16, wherein the computer is programmed to increase the amount of regenerative braking as tension in the tow member decreases.

18. The vehicle of claim 16, wherein the computer is further programmed to control regenerative braking of the towed vehicle based upon a state of charge of the traction battery.

19. The vehicle of claim 16, wherein the computer is programmed to, in one mode of operation, command the traction motor to output torque to assist in propelling the wheels at a rate greater than a rate of acceleration of the vehicle.

20. The vehicle of claim 16, wherein the computer is programmed to, in one mode of operation, command regenerative braking while the vehicle is accelerating.

\* \* \* \* \*